Patented Feb. 18, 1947

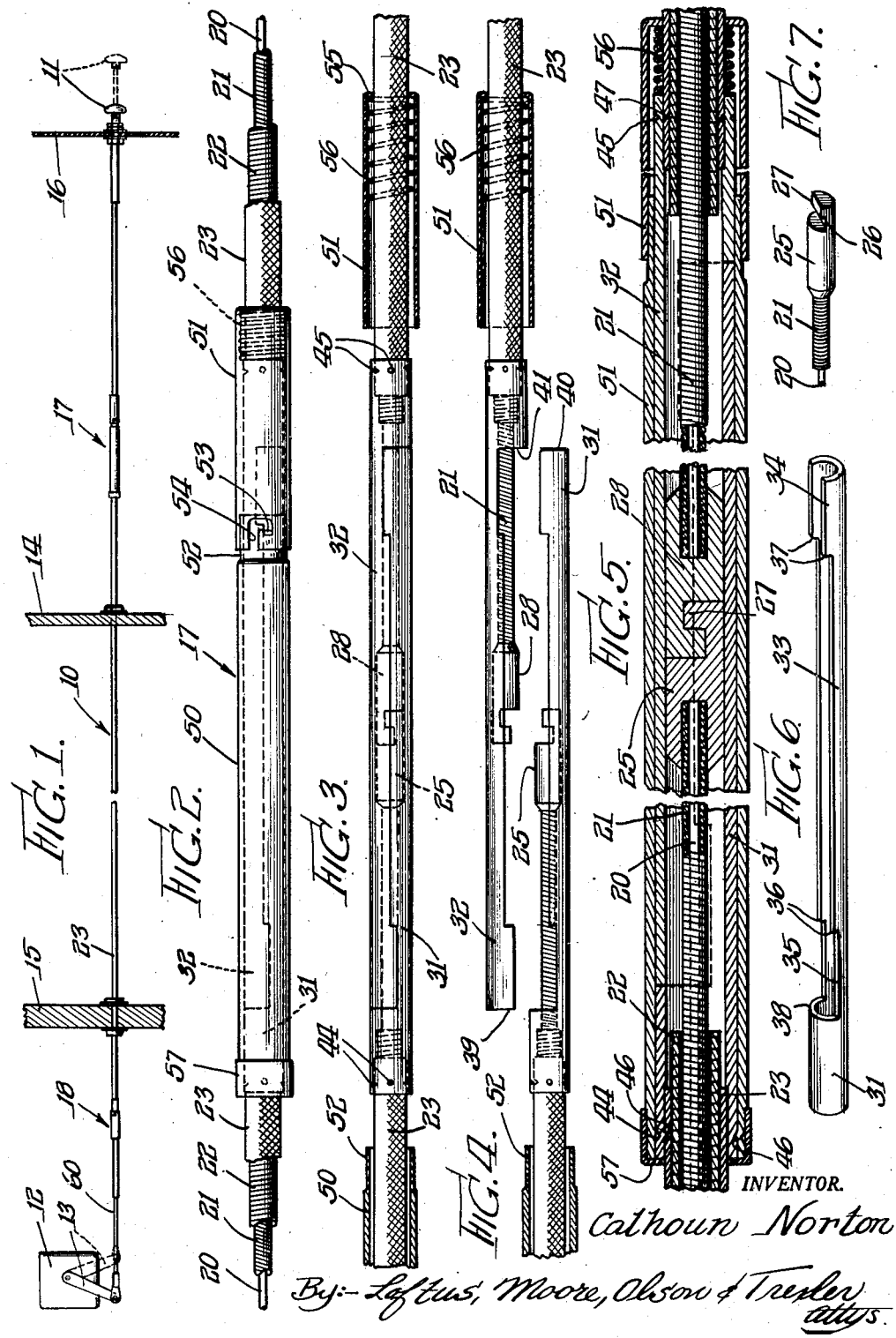

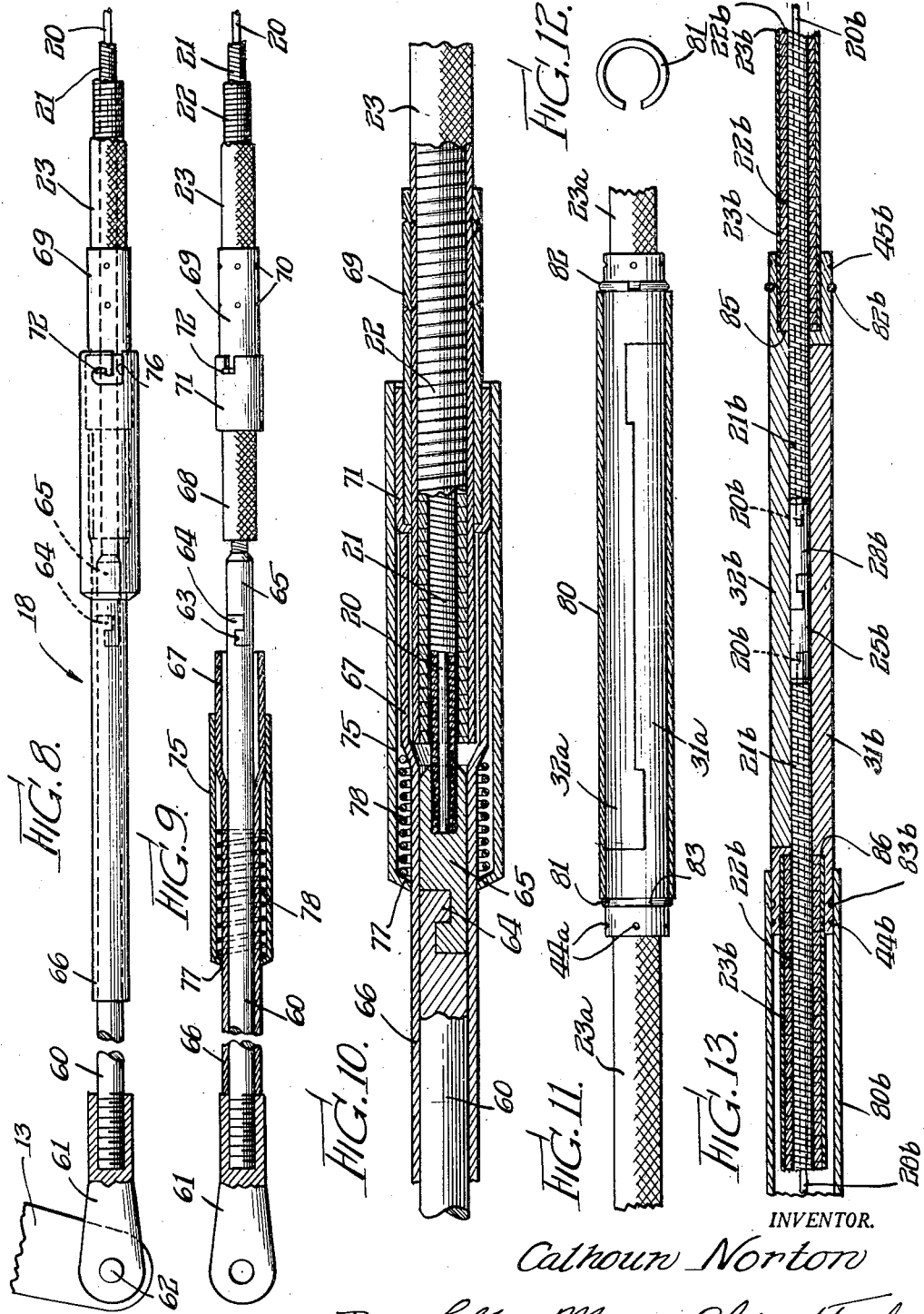

2,416,206

UNITED STATES PATENT OFFICE 2,416,206

TRANSMISSION CABLE STRUCTURE

Calhoun Norton, Chicago, Ill., assignor to Arens Controls, Inc., Chicago, Ill., a corporation of Illinois Application April 8, 1943, Serial No. 482,335

15 Claims. (Cl. 74—501)

1

This invention relates to cable structures, and particularly to transmission cables adapted to transmit control or operating movements such as reciprocatory or rotational movements. The invention concerns particularly structural arrangements whereby the cable body parts or end connections, including both sheath and shiftable transmission portions, may be readily connected and disconnected as may be required to effect cable separation.

It is an object of the invention to provide an improved transmission cable structure. More specifically stated, it is an object of the invention to provide a transmission cable structure wherein the cable parts, either body parts or end connections, and including both the stationary and shiftable portions thereof, may be readily connected and disconnected as required.

A further object of the invention is to provide a transmission cable structure of the type defined wherein the separation may be readily effected without the use of special tools, and as frequently as may be desired, but without impairment of the operation and functioning of the cable parts when connected for use.

A still further object of the invention is to adapt the principles thereof to flexible transmission cables, and particularly flexible cables of the type having a flexible sheath and a composite flexible inner or transmission structure.

Various other objects, advantages and features of the invention will be apparent from the following specification when taken in connection with the accompanying drawings wherein certain preferred embodiments of the invention are set forth for purposes of illustration.

In the drawings, wherein like reference numerals refer to like parts throughout:

Fig. 1 is a general assembly view illustrating a transmission cable installation incorporating a cable structure constructed in accordance with the invention and embodying the principles thereof;

Fig. 2 is a detail view, on an enlarged scale, of one of the disconnectable joints of the cable structure illustrated in Fig. 1;

Fig. 3 is a detail view of the structure of Fig. 2, but showing the outer retention sleeve in disconnected position;

Fig. 4 is a view of the structure of Fig. 3 showing the cable parts disconnected;

Fig. 5 is a longitudinal sectional view of the structure of Fig. 2, on a further enlarged scale, and more particularly illustrating the details of construction;

2

Figs. 6 and 7 are detail perspective views illustrating certain of the sheath and inner cable portions;

Fig. 8 is a detail view illustrating another of the disconnectable joints incorporated in the cable structure of Fig. 1;

Fig. 9 is a view of the structure of Fig. 8, but showing the outer retention sleeve in disconnected position;

Fig. 10 is a longitudinal sectional view of the structure of Fig. 8, on a further enlarged scale, and more particularly illustrating the details of the construction;

Fig. 11 is a view of a structure similar to Fig. 2, but embodying a modified form of retention sleeve;

Fig. 12 is a detail view of one of the holding clips as embodied in the structure of Fig. 11; and Fig. 13 is a longitudinal sectional view illustrating a modified form of structure wherein the inner cable portions are adapted for extended or increased shifting range.

Referring more particularly to the drawings, in Fig. 1 there is set forth for purposes of illustration, a control installation embodying a transmission cable structure constructed in accordance with the principles of the invention. As shown, the transmission cable structure is of the flexible type and generally indicated by the numeral 10, and is adapted to connect an operating handle or knob 11 and a device 12 having an operating arm 13 to be controlled. The cable structure is adapted to extend through, and be supported by wall members 14 and 15 comprising a part of the frame of the mechanism or structure with which the control installation is to be associated. The control handle or knob 11 is supported by a frame wall 16. In a typical installation, for example, the wall member 16 may be the dashboard of an aircraft or other vehicle, and the walls 14 and 15 may be frame wall portions of the vehicle. As will be more specifically hereinafter described, the transmission cable structure 10 comprises a stationary outer sheath within which the inner or movable cable portions are adapted to be shifted. The stationary or sheath cable portions are adapted to be fixed to and supported by the walls 14, 15 and 16, whereas the shiftable inner cable portions are adapted for connection to the control knob 11 and the operated lever 13 of the device to be controlled. As the control knob is shifted between its full and dotted line positions as shown in Fig. 1, the operated lever 13 of the controlled device will similarly be shifted between its full and dotted line positions as will be understood by those familiar with the art.

In installations of this character it is frequently desirable or necessary to remove the controlled device, such as the device 12, from the associated support structures of the vehicle, or to remove the dashboard or panel 16 and its associated controls from the vehicle. In accordance with the present invention, readily disconnectable means is provided, for example as indicated at 17 and 18, whereby to permit the separation of the cable parts to facilitate such removal operations, or for other reasons as may occur.

For illustrative purposes the disconnectable joint 17 is arranged in the body of the transmission cable structure, and is shown in detail in Figs. 2 to 7 inclusive. The disconnectable joint 18 is arranged adjacent the end of the cable structure, and is shown in detail in Figs. 8, 9 and 10.

Referring more specifically to Figs. 2 to 7 inclusive, the cable structure illustrated comprises an inner or shiftable cable portion composed of a central core wire 20 and a wire coil 21 embracing the core 20 and secured at its ends thereto. The core 20 and coil 21 comprise the transmission elements of the cable, and are shiftable as a unit within a sheath composed of a wire coil 22 and a suitable covering 23. The covering 23 may be of any suitable waterproof and wear resistant material such as rubber, fabric or the like, and is arranged in fixed embracing relation to the sheath coil 22. A flexible transmission cable structure is thus provided. While one preferred form of cable structure has been set forth for purposes of illustration, it is to be understood that other forms of shiftable and sheath structures, flexible or non-flexible, may be used.

In accordance with the invention and to provide the disconnectable joint 17, the transmission elements of the cable, comprising the core 20 and the wire coil 21, on one side of the disconnectable joint, are provided with a fitting or connection member 25 of generally cylindrical form and of a shaping which will be best understood by reference to Fig. 7. It will be seen that the connection member 25 is provided on its end with a slot 26 and lug portion 27 which are adapted to interfit, in a manner indicated in Figs. 3, 4 and 5, with a similar slot and lug arrangement provided on a similarly formed and complementary fitting or connection member 28 secured to the cable transmission elements extending in the opposite direction from the joint 17. As shown in Fig. 5, the complementary connection members 25 and 28 are provided with axial counterbores within which the core 20 and wire coil 21 are received, the members being secured on the ends of the coil wire and coil by swedging or soldering or the like, whereby to provide a permanent tension and compression resisting connection. It will be seen that when the connection members 25 and 28 are interlocked, as shown in Fig. 5, the adjacent ends of the wire core 20 and associated coil 21 are connected for the transmission of either compressive or pulling movements, the parts being adapted to shift as a unit within the cable sheath portions.

The adjacent sheath portions of the cable are similarly provided with fittings or connection members 31 and 32, the member 31 being shown in perspective detail in Fig. 6. Both of these members are similarly formed, and are arranged for complementary interfitted engagement. Referring, for example, to the member 31, as shown in Fig. 6, it will be seen that it comprises a semicylindrical portion 33, a portion 34 on its end of slightly greater than semicylindrical extent, and a portion 35 of slightly less than semicylindrical extent. Abutment shoulders 36 are formed between the portions 33 and 35, and abutment shoulders 37 are formed between the portions 33 and 34. It will be understood that when the fittings 31 and 32 are interengaged, as shown in Fig. 3, the abutment shoulders 36 and 37 of the fitting 31, in cooperation with the similarly formed abutment shoulders of the fitting 32 prevent the pulling apart of the fittings. The wall portion or abutment surface 38, Fig. 6, of the fitting 31 in cooperation with the end surface 39, Fig. 4, of the fitting 32, and the end surface 40 of the fitting 31 in cooperation with the abutment wall 41 of the fitting 32 prevent the telescoping or unauthorized movement of the fittings axially relatively toward each other. Accordingly it will be seen that when the fittings are in interconnected engagement they are prevented from relative axial motion in either direction. The several abutment shoulders and surfaces, such as the shoulders 36 and 37, and the abutment surfaces 38, 39, 40 and 41 are all preferably formed so that the engaged abutting walls or surfaces are perpendicularly disposed with reference to the axis of the cable. By reason of this arrangement the fittings experience no tendency toward separation as they are subjected to axial stresses either of tension or compression. The two fittings or connection members 31 and 32, when in interfitted engagement, together form a cylindrical sleeve within which the complementary fittings 25 and 28, and the associated inner transmission parts 20 and 21 of the cable are longitudinally reciprocable. The parts are proportioned so that the fittings 25 and 28 are freely slidable within the fittings 31 and 32, and are also rotatable therein if such movement is desired.

The fittings 31 and 32 are permanently secured with their associated cable sheath portions by means of punched indentations, for example as indicated at 44 and 45, or other suitable means. These punched indentations deform the metal of the fittings into interlocked engagement with the cable sheath, as indicated at 46 and 47 in Fig. 5, forming a secure connection resisting axial stresses tending to move the adjacent cable sheath portions either relatively away from each other or toward each other in an axial direction.

To secure the fittings 31 and 32 against lateral separation after they have been interengaged, outer retention sleeve means is provided. As shown in Figs. 2–5, such outer retention sleeve means may comprise a main sleeve 50 and an auxiliary sleeve 51 adapted to be held in connected engagement by means of a bayonet slot connection. More particularly, the main sleeve 50 is provided with an end portion 52 of reduced outer diameter upon which are formed a pair of oppositely radially extending lugs 53. The auxiliary sleeve 51 is formed with a pair of corresponding diametrically positioned bayonet slots 54, the lugs 53 and slots 54 providing a bayonet type connection between the sleeves when the auxiliary sleeve is brought into telescoping relation with the reduced end 52 of the main sleeve, and slightly rotated, as will be understood. The end surface of the auxiliary sleeve 51 is radially inturned as indicated at 55 in Fig. 3, and a compression spring 56 is arranged within the sleeve in abutting engagement with the inturned wall 55, and loosely slidable on the cable sheath. When the auxiliary sleeve 51 and main sleeve 50 are brought into position for engagement, as shown in Fig. 2, the end of the compression spring 56 abuts the end of the fitting 32, as illustrated in Fig. 5, thereby tending to urge the auxiliary sleeve to the right, to hold the lugs 53 in tight engagement within the bayonet slots 54; the main sleeve 50 being limited in its rightward movement by an end cap 57 fixed thereon which is brought into abutting engagement with the end of the fitting 31.

It will be seen that to assemble the joint 17 it is merely necessary first to interfit the complementary fittings or connection members 25 and 28 and simultaneously interfit the fittings 31 and 32 by moving the parts laterally toward each other from the position of Fig. 4 to the position of Fig. 3, after which the main and auxiliary retention sleeves 50 and 51 are moved from their Fig. 3 position to their position as shown in Fig. 2, whereby to form the completed connection. To effect separation of the joint, the foregoing operations are reversed. The connecting or disconnecting operations may thus be effected without the use of any special tools, and as often as may be required. When the parts are in assembled position, as shown in Figs. 2 and 5, the transmission elements of the cable comprising the core 20, the wire coil 21, and the fittings 25 and 28 are freely slidable or rotatable within the cable sheath and fitting members 31 and 32, thereby permitting the functioning of the transmission cable for its intended purpose. Repeated connection and disconnection of the joint will in no way impair the operative functioning of the cable parts when connected and assembled for operation. At the same time separation and reconnection of the cable may be effected with a minimum of effort and with a minimum expenditure of time.

In Figs. 8, 9 and 10 the details of the connection 18 are illustrated, wherein the disconnectable joint is provided in immediate juxtaposition to the end connection 60 of the cable structure. In the particular embodiment illustrated, this end connection or member comprises a rod 60, Fig. 8, threadedly connected to a yoke member 61 which is in turn connected by means of a pivot pin 62 to the lever 13 of the device to be controlled.

In the embodiment illustrated, the rod 60 is provided at its end with a slot 63 and projection 64, adapted to interfit with a similar slot and projection formed on a fitting 65 formed and secured to the transmission portions 20 and 21 of the cable, in a manner similar to the fitting 25 in the embodiment previously described. The rod 60 is slidable within a sheath member 66, the end 67 of which is enlarged slightly, as shown in Fig. 9, so as to be loosely slidable over the end 68 of the cable sheath 23. A sleeve 69 is fixed to the cable sheath by means of punched indentations 70, similar to the indentations 44 and 45 previously described, said sleeve 69 having fixed thereto a cap member 71 provided with opposite radially extending bayonet lugs 72. When the parts are in assembled position, as shown in Figs. 8 and 10, the end of the enlarged portion 67 of the sheath 66 is adapted to abut the cap 71 as perhaps best shown in Fig. 10, the member 66 with the sheath 22, 23, thus forming a sheath structure within which the shiftable elements of the cable comprising the core 20, the coil 21, the fitting 65 and the rod 60 are longitudinally reciprocable and rotatable if desired.

A retention sleeve 75 is arranged on the sheath member 66, said retention sleeve being provided with bayonet slots 76, Fig. 8, and with an inturned end wall 77, Fig. 9, forming the reaction surface for a compression spring 78. This compression spring, when the parts are in assembled position, abuts the enlarged portion 67 of the sheath 66, as shown in Fig. 10, thereby urging the retention sleeve 75 to the left as seen in Fig. 8, to hold the bayonet projections and slots in proper interfitted engagement.

The manner of connecting and disconnecting the joint 18, and the operation of the structure is believed to be clear from what has heretofore been said in reference to the joint 17, suffice to say that the joint may be readily assembled by merely bringing the fitting 65 and rod 60 laterally into engagement, sliding the sheath 66 to the right as seen in Fig. 9 to shift the enlarged end 67 over the adjacent end 68 of the cable sheath 22, 23, and thereafter moving the retention sleeve 75 into position.

In Figs. 11 and 12 a modified embodiment is illustrated, similar to that shown in Figs. 2 to 7 inclusive, but incorporating a modified form of retention sleeve structure. In this instance, the retention sleeve, as shown at 80 is formed as a single member, and is held in place upon the fittings 31a and 32a by a pair of spring clips 81 and 82. More particularly, the fitting 31a is provided with an annular groove 83 into which the spring clip 81 is adapted to be sprung after the sleeve 80 has been shifted axially into assembled position as shown in Fig. 11. The fitting 32a is provided with a similar annular groove into which the spring clip 82 is adapted to be sprung. In Fig. 12 one of the spring clips, specifically the clip 81, is illustrated in detail. Both clips may be similarly formed.

In this form of the invention it will be seen that the retention sleeve 80 comprises but a single member and after being axially slid into encompassing relation to the fittings 31a and 32a, is held in position by the clips 81 and 82.

In Fig. 13 an embodiment of the invention is illustrated wherein the inner transmission elements of the cable are adapted for extended shifting movement, beyond the length of the sheath fittings or connection members. More specifically in this instance the fittings 25b and 28b, functionally similar to the fittings 25 and 28 previously described, are adapted to receive only the ends of the core wire 20b, and have a diameter equal to the wire coil 21b which is secured to and shifts as a unit with the core wire, as previously described. The sheath fittings 31b and 32b, functionally similar to the fittings 31 and 32 previously described, in this instance have an inner bore equal in diameter to the bore of the sheath coil 22b, the ends of the fittings being counterbored, as indicated at 85 and 86 to receive the ends of the coils 22b with their associated coverings 23b. Punched depressions as indicated as 44b and 45b may be provided for holding the fittings 31b and 32b in position on the cable sheath ends, as previously described. As illustrated in Fig. 13, the retention sleeve 80b is similar in form to the sleeve 80, as shown in Fig. 11, being held in place by spring clips as indicated at 82b and as previously described.

It will be seen that in this instance the sheath fittings 31b and 32b form, with the sheath coil 22b, a continuous bore of uniform diameter within which the fittings 25b and 28b and the associated cable transmission members 20b and 21b may be longitudinally shifted and rotated as required. Due to the fact that a bore of uniform diameter is provided extending completely through the disconnectable joint, the axial shifting movement of the fittings 25b and 28b is not limited to the axial length of the fittings 31b and 32b, as is true for example in the embodiment of Figs. 2 to 7 inclusive. In said embodiment of Figs. 2–7 it is to be understood that the permissible movement will be sufficient to meet the requirements of the particular installation, but in certain instances a greater extent of travel, as permitted by the structure of Fig. 13, may be desired.

It is obvious that various changes may be made in the specific embodiments shown and described without departing from the spirit of the invention. The invention is accordingly not to be limited to the particular embodiments illustrated, but only as indicated in the following claims.

The invention is hereby claimed as follows:

1. A transmission cable construction comprising an elongated transmission member, adjacent sections of said transmission member being provided with interengageable portions adapted to be interconnected to secure said transmission member sections for movement together as a unit when subjected to either tension or compression, and a sheath within which said elongated transmission member is movable, said sheath serving to hold the interengageable portions of the transmission member sections from disengagement when said portions are arranged within the sheath, and said interengageable portions being freely disengageable when removed from the sheath, said sheath comprising a pair of members having snap locked interengageable portions preventing the sheath members from relative axial movement when they are in axial alinement.

2. A transmission cable construction comprising an elongated transmission member, adjacent sections of said transmission member being provided with interengageable portions having interlocking surfaces angularly disposed with respect to the longitudinal axis of the transmission member, said interengageable portions being adapted to be interconnected whereby to secure said transmission member sections for movement together as a unit, and a sheath within which said elongated transmission member is movable, said sheath serving to hold the interengageable portions of the transmission member sections from disengagement when said portions are arranged within the sheath, and said interengageable portions being freely disengageable when removed from the sheath, said sheath comprising a pair of members provided with snap locked interlocking surfaces angularly disposed with respect to the longitudinal sheath axis for preventing the sheath members from relative axial movement when they are in axial alinement.

3. A transmission cable construction as defined in claim 2, wherein said interlocking surfaces on the transmission member sections and on the sheath members are substantially perpendicularly disposed with respect to the longitudinal axis of the transmission member.

4. A transmission cable construction comprising an elongated transmission member, adjacent sections of said transmission member being provided with interengageable portions adapted to be interconnected to secure said transmission member sections for movement together as a unit when subjected to either tension or compression, and a sheath within which said elongated transmission member is movable, said sheath serving to hold the interengageable portions of the transmission member sections from disengagement when said portions are arranged within the sheath, said sheath comprising a pair of members having interengageable portions preventing the sheath members from relative axial movement when they are in axial alinement, and a sleeve for holding the sheath members in said axial alinement to maintain the interengageable portions of the transmission member sections from disengagement.

5. A transmission cable construction comprising an elongated transmission member, said transmission member including a central core wire and a wire coil encompassing the core, disengageable attachment means for the transmission member comprising a pair of complementary members adapted to be interfitted and secured together from separation when subjected to tension or compression, at least one of said complementary members being immovably secured to said transmission member, and a sheath encompassing the complementary members and within which said members are movable, said sheath serving to hold said complementary members in interengaged relation while they are disposed within said sheath, and said sheath comprising a pair of members having spring locked interengageable portions preventing the sheath members from relative axial movement when they are in axial alinement.

6. A transmission cable construction comprising an elongated transmission member, adjacent sections of said transmission member being provided with interengageable portions adapted to be interconnected to secure said transmission member sections for movement together as a unit when subjected to either tension or compression, and a sheath within which said elongated transmission member is movable, adjacent sections of said sheath being provided with interengageable portions adapted to be interconnected together from separation when subjected to tension or compression, and said sheath embracing and serving to hold the interengageable portions of the transmission member sections from disengagement when said portions are arranged within the sheath, a sleeve encompassing the sheath sections for holding them in interengaged relation, and resilient means for positioning the sleeve in encompassing position.

7. A transmission cable construction comprising a sheath, complementary members having surfaces disposed at an angle to the longitudinal axis of the sheath connected to adjacent portions of the sheath, said complementary members being adapted to be interfitted and interlocked together whereby to secure said adjacent sheath portions together from separation when subjected to tension or compression, spring actuated means for maintaining said complementary members in interfitted engagement, an elongated transmission member within the sheath, and complementary members having surfaces disposed at an angle to the longitudinal axis of the transmission member connected to adjacent portions of said transmission member, said last named complementary members also being adapted to be interfitted and interlocked together whereby to connect said transmission member portions for movement as a unit within said sheath when subjected to either tension or compression.

8. A transmission cable construction comprising a sheath, complementary members having surfaces disposed at an angle to the longitudinal axis of the sheath connected to adjacent portions of the sheath, said complementary members being adapted to be interfitted and secured together whereby to secure said adjacent sheath portions together from separation when subjected to tension or compression, an elongated transmission member within the sheath, and complementary members having surfaces disposed at an angle to the longitudinal axis of the transmission member connected to adjacent portions of said transmission member, said last named complementary members also being adapted to be interfitted and secured together whereby to connect said transmission member portions for movement as a unit within said sheath from separation when subjected to tension or compression, and an axially shiftable sleeve for holding said sheath connected complementary members in interfitted relation.

9. A transmission cable as defined in claim 7, wherein said transmission member comprises a central core wire and a wire coil in embracing relation to the core.

10. A transmission cable construction comprising a sheath, complementary members having surfaces disposed at an angle to the longitudinal axis of the sheath connected to adjacent portions of the sheath, said complementary members being adapted to be interfitted and interlocked together whereby to secure said adjacent sheath portions together from separation when subjected to tension or compression, an elongated transmission member within the sheath, said transmission member comprising a central wire core and a wire coil in embracing relation to the core, complementary members having surfaces disposed at an angle to the longitudinal axis of the transmission member connected to adjacent portions of said transmission member, said last named complementary members also being adapted to be interfitted and interlocked together whereby to connect said transmission members portions for movement as a unit within said sheath from separation when subjected to tension or compression, an axially shiftable sleeve for holding the sheath connected complementary members in interfitted relation, and snap locked means for anchoring said sleeve in axially shifted position.

11. A transmission cable construction as defined in claim 1, wherein said interengageable portions of the transmission member sections are of an external diameter no greater than the internal diameter of the sheath.

12. A transmission cable construction as defined in claim 7, wherein said transmission member connected complementary members are of an external diameter no greater than the internal diameter of said sheath.

13. A transmission cable construction as defined in claim 8, wherein means is provided for holding the sleeve against axial shiftable movement, said means comprising a bayonet joint connection and a compression spring operatively associated therewith and arranged to embrace the cable structure.

14. A transmission cable construction comprising an elongated transmission member, adjacent sections of said transmission member being provided with interengageable portions adapted to be interconnected to secure said transmission member sections for movement together as a unit when subjected to either tension or compression, and a sheath within which said elongated transmission member is movable, said sheath providing a pair of concentric relatively shiftable sleeves embracing the interengageable transmission member portions for holding them in interengagement when they are disposed within the sleeves, and a spring reacting between said sleeves for holding them in embracing position.

15. A transmission cable construction comprising an elongated transmission member, adjacent sections of said transmission member being provided with interengageable portions adapted to be interconnected to secure said transmission member sections for movement together as a unit when subjected to either tension or compression, and a sheath within which said elongated transmission member is movable, adjacent sections of said sheath being provided with interengageable portions adapted to be interconnected together, means including a spring embracing the cable structure for holding said sheath portions in engaged position, and said sheath serving to hold the interengageable portions of the transmission member sections from disengagement when said portions are arranged within the sheath.

CALHOUN NORTON.

REFERENCES CITED

The following references are of record in the file of this patent:

UNITED STATES PATENTS

| Number | Name | Date |
|---|---|---|
| 2,296,993 | Gerry | Sept. 29, 1942 |
| 359,717 | Dring et al. | Apr. 3, 1906 |
| 2,148,867 | Lesage | Feb. 28, 1939 |

FOREIGN PATENTS

| Number | Country | Date |
|---|---|---|
| 780,002 | French | Apr. 17, 1935 |
| 810,150 | French | Dec. 19, 1936 |
| 779,083 | French | Jan. 5, 1935 |

Certificate of Correction

Patent No. 2,416,206.  February 18, 1947.

CALHOUN NORTON

It is hereby certified that errors appear in the printed specification of the above numbered patent requiring correction as follows: Column 3, line 59, for "coil" first occurrence, read *core*; column 9, line 46, for "members" read *member*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*